United States Patent Office 3,422,082
Patented Jan. 14, 1969

3,422,082
POLYMERIZATION OF VINYL CHLORIDE
Edwin J. Vandenberg, Wilmington, Del., assignor to Hercules Incorporated, a corporation of Delaware
No Drawing. Continuation-in-part of application Ser. No. 579,139, Apr. 19, 1956. This application July 30, 1956, Ser. No. 600,715
U.S. Cl. 260—92.8       15 Claims
Int. Cl. C08f 3/30

ABSTRACT OF THE DISCLOSURE

Crystalline polyvinyl chloride prepared in the presence of a catalyst system comprising a metal compound and an organometallic compound.

---

This invention relates to a new polyvinyl chloride and to its method of preparation, this new polyvinyl chloride being a distinctly crystalline polymer and exhibiting a crystalline type X-ray diffraction powder pattern.

It is well known that vinyl chloride may be polymerized in bulk, solution, suspension, or emulsion polymerization systems with free radical type catalysts, as for example, with hydrogen peroxide, acyl peroxides such as benzoyl peroxide, persulfates, peracetic acid, aliphatic azo initiators such as $\alpha,\alpha'$-azo-bis-isobutyronitrile, etc. In every case the polymer that is obtained is of the same type but of varying molecular weight. These polyvinyl chlorides are amorphous in character, and X-ray diffraction patterns of the polyvinyl chlorides produced by these methods are diffuse, demonstrating that there are structural features in the polymer which are unfavorable to crystallization. In fact, the polymers are so very poorly crystalline that the X-ray diffraction pattern even of a drawn fiber shows only a very few diffuse spots and the only definite information that has been obtained from the pattern is that there is a chain repeat distance of about 5.1 A. There are too few crystal reflections to permit even tentative unit cell dimensions to be considered. In order to prepare extruded polyvinyl chloride products of higher linear tensile strength, it is frequently a practice in commercial operations to enhance the orientation by "racking," i.e., permanently stretching the polymer beyond its elastic limit in a hot water bath and then cooling while in the stretched position.

Now, in accordance with this invention, it has been discovered that a highly crystalline polyvinyl chloride may be produced by contacting vinyl chloride with a catalyst, formed by mixing a compound of a metal of Groups IV–B, V–B, VI–B, VII–B or VIII of the Periodic Table with an organometallic compound of a metal of Groups I, II or III of the Periodic Table. The polyvinyl chloride so obtained is a highly crystalline polymer that exhibits a very definite X-ray diffraction powder pattern. The crystal lattice spacings and relative intensities of the diffraction lines of a typical polyvinyl chloride produced in accordance with this invention are as follows:

| Crystal lattice spacings, $d$, A.: | Approximate relative intensities (on a scale of 10) |
|---|---|
| 5.3 | 8 |
| 4.75 | 10 |
| 3.60 (broad) | 6 |
| 2.90 | 2 |
| 2.58 | 1 |
| 2.29 | 2 |

The polymerization of vinyl chloride in accordance with this invention may be carried out in a wide variety of ways. The process may be a batch or continuous operation and may be carried out with or without the use of an inert organic diluent as the reaction medium. Any inert liquid organic diluent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hyrdocarbons, halogenated hydrocarbons such as ethyl chloride, methyl chloride, methylene chloride, ethylene chloride, chlorobenzene, and aliphatic ethers, cycloaliphatic ethers, aromatic ethers, and cyclic ethers, as for example, diethyl ether, dioxane, tetrahydrofuran, etc. If aromatic hydrocarbons are used, care should be taken to select conditions that will avoid any appreciable alkylation of the aryl nucleus by side reactions taking place in the polymerization reaction. Of particular value for carrying out the polymerization are the ethers such as diethyl ether and tetrahydorfuran or halogenated aliphatic hydrocarbons such as methylene chloride and ethylene chloride.

The selection of the temperature and pressure used for the polymerization process will obviously depend upon the activity of the catalyst system being used, the diluent used, the degree of polymerization desired, etc. In general, the polymerization will be carried out at room temperature or slightly above, but any temperature within the range of from about $-50°$ C. to about $150°$ C., and preferably from about $-20°$ C. to about $100°$ C., may be used. In the same way, while atmospheric pressure or a pressure of only a few pounds may be used, the polymerization may be carried out under a wide range of pressures, as for example, from a partial vacuum to about 1000 pounds and preferably from about atmospheric to about 500 pounds pressure. Higher pressures may, of course, be used but generally do not appreciably alter the course of the polymerization.

In the polymerization of vinyl chloride in accordance with this invention using as the catalyst for the polymerization a combination of a compound of a metal of Groups IV–B, V–B, VI–B, VII–B and VIII of the Periodic Table with an organometallic compound, any inorganic or organic salt or complex of the metals of Groups IV–B, V–B, VI–B, VII–B, or VIII may be used. Thus, any compound of titanium, zirconium, hafnium, thorium, vanadium, tantalum, chromium, molybdenum, tungsten, uranium, manganese, rhenium, iron, or cobalt, etc., may be used. Exemplary of such compounds are titanium tetrachloride, zirconium tetrachloride, titanium trichloride, vanadium dichloride, vanadium trichloride, vanadium, trifluoride, vanadium oxychloride, vanadium oxydichloride, tantalum pentachloride, molybdenum trichloride, molybdenum pentachloride, chromium dichloride, chromium trichloride, ferric chloride, manganese dichloride, vanadium trioxide, vanadium pentoxide, chromium oxide, vanadium oxyacetylacetonate, chromium acetylacetonate, cobalt acetylacetonate, iron acetylacetonate, manganese acetylacetonate, alkyl vanadates, alkyl titanates, etc., or the reaction product produced by mixing a compound such as titanium tetrachloride, vanadium tetrachloride, etc., with an organometallic compound of an alkali metal, alkaline earth metal, zinc, or aluminum. When a compound such as titanium tetrachloride, vanadium tetrachloride, vanadium oxytrichloride, etc., is mixed with the above-mentioned organometallic compounds, a reaction takes place which is believed to be a reduction of the transition metal compound from the higher valence of the transition metal to one or more of its lower valence states.

In carrying out the reaction of the transition metal compound with an organometallic compound prior to its use in the polymerization system, as already pointed out, any organometallic compound of an alkali metal, alkaline earth metal, zinc, or aluminum may be used. Exemplary of such organometallic compounds are the alkali metal alkyls or aryls such as butyllithium, amylsodium, phenylsodium, etc., dimethyl magnesium, diethyl magnesium, diethyl zinc, butyl magnesium chloride, phenyl magnesium bromide, triethylaluminum, tributylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, diproyplaluminum fluoride, diisobutylaluminum fluoride, diisobutylaluminum chloride, diethylaluminum hydride, ethylaluminum hydride, diisobutylaluminum hydride, etc., and complexes of such organometallic compounds, as for example, sodium aluminum tetraethyl, lithium aluminum tetraoctyl, sodium aluminum triethyl chloride, etc. If the organometallic compound that is used is insoluble in the reaction mixture, it may be desirable to reduce the particle size of it prior to use by ball-milling or other means. The molar ratio of the organometallic compounds to the transition metal compound in carrying out the reaction may be varied over a wide range, but usually there should be used an amount of the organometallic compound that will produce the desired amount of reduction. Thus, larger ratios of organometallic compound to the transition metal compound are required for alkali metal alkyls than for trialkylaluminum compounds, etc. In general, the reaction is carried out by mixing the transition metal compound and the organometallic compound in an inert organic diluent. The insoluble precipitate which is formed may be separated from the inert diluent and then added to the polymerization system in combination with the organoaluminum compound. This separation of the insoluble reaction product from the diluent may be carried out by means of centrifugation, filtration, etc. In some cases it may be desirable to wash the insoluble reaction product with additional amounts of the diluent in order to completely remove all of the soluble by-products. On the other hand, the suspension of the reaction product produced may be used directly in the polymerization system without going through the separation step. The reaction product may be used immediately or it may be aged by allowing the reaction mixture to stand at room temperature for anywhere from a few minutes to several hours or longer, or it may be subjected to a heat treatment, i.e., heating the reaction mixture at elevated temperatures.

In carrying out the polymerization of the vinyl chloride with the combination of transition metal compound with organometallic compound, it is usually preferable to utilize the transition metal compound in a finely divided form. Such a finely divided form is obtained when a transition metal compound is reduced with the organometallic compound prior to the polymerization as described above. Another means of obtaining a finely divided form of the transition metal compound is to subject the compound, as for example, vanadium trichloride or vanadium oxydichloride, to a ball-milling operation carried out in an inert diluent. By such means it is possible to produce almost any desired particle size.

As pointed out above, any organometallic compound of a metal of Groups I, II, or III of the Periodic Table, i.e., an alkali metal, alkaline earth metal, zinc, or aluminum, may be used in combination with the transition metal compound to catalyze the polymerization of vinyl chloride in accordance with this invention. Thus, any alkali metal alkyl or aryl, alkaline earth metal alkyl or aryl, or aluminum alkyl or meta alkyl halides or hydrides may be used. For optimum results the choice of the organometallic compound will depend upon the choice of transition metal compounds. Thus, Group IV-B metal compounds are preferably used in combination with an alkaline earth alkyl such as diethyl magnesium, and Group V-B metal compounds are preferably used in combination with an alkaline earth or aluminum alkyl and more preferably aluminum organometallic compounds, etc. Exemplary of the organometallic compounds that may be used are butyllithium, amylsodium, phenylsodium, dimethyl magnesium, diethyl magnesium, diethyl zinc, butyl magnesium chloride, ethyl magnesium chloride, phenyl magnesium bromide, trimethylaluminum, triethylaluminum, tripropylaluminum, triisobutylaluminum, trioctylaluminum, triodododecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diisobutylaluminum chloride, diethylaluminum hydride, ethylaluminum dihydride, diisobutylaluminum hydride, and complexes of such organoaluminum compounds, as for example, sodium aluminum tetraethyl, lithium aluminum triethylbutyl, lithium aluminum trioctylbutyl, sodium aluminum triethyl chloride, etc.

Any mode of introducing the two catalyst components into the polymerization system may be utilized. Usually the organometallic compound and the transition metal compound are added in the form of solutions or suspensions in inert organic diluents. Either one may be introduced into the system followed by the second or they may be introduced simultaneously, or added in increments or continuously throughout the polymerization. The amount of the two catalyst components may be varied over a wide range, but in general, the molar ratio of organometallic compound to transition metal compound will be within the range of from about 0.1:1 to about 20:1 and preferably within the range of about 0.3:1 to about 10:1.

In accordance with this invention, using a combination of transition metal compound and organometallic compound, it is frequently desirable to incorporate in the reaction mixture a complexing agent for the organometallic compound used for the polymerization. Just what may be the function of the complexing agent is not completely understood, but it is believed that it forms a complex with the organometallic compound to prevent any undesirable side reactions which might otherwise take place between the organometallic compound and the monomer or polymer. Any compound that will form a loose type of complex (possibly functioning as an electron donor) with the organometallic compound may be used, as for example, ethers, tertiary amines, esters, ketones, nitroaromatics, etc., provided it does not destroy an excessive amount of the organometallic compound present. Exemplary of the complexing agents that have been found to be particularly effective are ethers such as diethyl ether, tetrahydrofuran, etc., triethylamine and ethyl acetate. Any amount of the complexing agent may be used, but preferably an amount is used such that at least about one mole of it per mole of organometallic compound present in the polymerization system is used. It may be added with the organometallic compound or in some cases with the transition metal compound, or it may be added to the solution of monomer. In many cases it may be desirable to use the complexing agent, as for example, diethyl ether and tetrahydrofuran, as the major component of the inert organic diluent being used for the polymerization process.

The polyvinyl chloride produced in accordance with this invention is a more linear polymer than ordinary polyvinyl chloride and has a higher melting point and better solvent resistance. Hence, it has a wide range of applications. It is useful for the preparation of films, fibers, and plastics which are tough, particularly when oriented. In the fabrication of such articles it is frequently desirable to add stabilizers and plasticizers. It may even be mixed with ordinary polyvinyl chloride if a more plastic article is desired than can be obtained with the usual plasticizers without exudation of the plasticizer from the surface of the article.

The following examples will illustrate the process of polymerizing vinyl chloride in accordance with this invention and some of the many modifications that can be made in this process. As may be seen from these examples, it is possible to select the proper conditions to prepare a polymer of various desired molecular weights. The relative molecular weight of the polymers produced in these examples is shown by the specific viscosity given for each, determined on a solution of the polymer in cyclohexanone at 135° C.

Example 1

A polymerization vessel was charged with 36 parts of tetrahydrofuran and after replacing the air in the vessel with nitrogen and evacuating, 11.8 parts of vinyl chloride and a solution of 0.40 part of triisobutylaluminum in 1.3 parts of n-heptane were added. After equilibrating the vessel and contents at 30° C., a suspension of 0.16 part of vandium trichloride in 5 parts of n-heptane was added (prepared by ball-milling the vanadium trichloride in the n-heptane for 6 hours at room temperature to a particle size of approximately 2 microns). The reaction mixture was agitated and held at 30° C. for 19 hours. The polymerization was then stopped by adding 4 parts of anhydrous ethanol. The insoluble polymer which had separated was isolated from the remainder of the reaction mixture by centrifugation, washed twice with tetrahydrofuran, and then twice with methanol, and finally was dried for 16 hours at room temperature under vacuum. The polyvinyl chloride so obtained had a crystalline-type X-ray diffraction powder patten.

The filtrate and tetrahydrofuran washes from the above were combined and an additional quantity of polymer was precipitated by adding 5 volumes of methanol. This fraction was collected, washed twice with methanol, and dried at room temperature under vacuum. It was then dissolved in boiling cyclohexanone, filtered while hot, and reprecipitated by adding 10 volumes of methanol. The polymer was collected, washed twice with methanol, dried for 16 hours at room temperature under vacuum, and then for 4 hours at 80° C. under vacuum. This fraction of polyvinyl chloride had a specific viscosity of 0.15 (solution in cyclohexanone at 135° C.) and on analysis contained 54.9% chlorine (theory 56.8%). It had a crystalline-type X-ray diffraction powder pattern like that described above.

Examples 2–6

A series of polymerization vessels was charged, as described in the foregoing example, with diluent, vinyl chloride, and the two catalyst components (added as solutions or suspensions in n-heptane). The polymerization ingredients and amount of each are set forth in Table I below. The vanadium trichloride used in Examples 2–5 had been ball-milled in n-heptane for 6 hours at room temperature to a particle size of about 2 microns and the vanadium oxydichloride used in Example 6 had been ball-milled for 6 hours to a particle size of about 30 microns.

After 19 hours at 30° C., each of the polymerizations was stopped by adding 1.6 parts butanol. The polymer was then isolated by adding to the reaction mixture 118 parts of anhydrous ethanol in Examples 2 and 3 and 100 parts of diethyl ether in Examples 4 to 6, centrifuging, washing twice with anhydrous ethanol, and then drying for 16 hours at room temperature under vacuum. The specific viscosity determined on a solution in cyclohexanone at 135° C. for each polymer is set forth in Table I. In each case the polyvinyl chloride exhibited the typical crystalline-type X-ray diffraction powder pattern described above.

Each of the polymers was fractionated by agitating with 50 parts of methyl isobutyl ketone per part of polymer for 16 hours. The insoluble polymer was separated, washed twice with methyl isobutyl ketone, and dried 4 hours at 80° C. The methyl isobutyl ketone insoluble fraction of the polyvinyl chloride in each case amounted to about 20% to 33% of the total polymer. The specific viscosity of each is set forth in Table I.

TABLE I

| Example | Vinyl chloride parts | Diluent | Parts | Organometallic compound | Parts | Vanadium compound | Parts | Specific Viscosity Alcohol or ether insol. polymer | Specific Viscosity Methyl isobutyl ketone insol. polymer |
|---|---|---|---|---|---|---|---|---|---|
| 2 | 9.6 | THF¹ n-Heptane | 11.5 8.6 | Al(i-C₄H₉)₃ | 0.40 | VCl₃ | 0.16 | 0.17 | 0.15 |
| 3 | 9.6 | THF¹ n-Heptane | 11.5 7.0 | Al(C₂H₅)₂Cl | 0.24 | VCl₃ | 0.12 | 0.17 | 0.20 |
| 4 | 10.5 | THF¹ n-Heptane | 17.2 4.2 | Al(i-C₄H₉)₂H | 0.28 | VCl₃ | 0.16 | 0.20 | 0.15 |
| 5 | 10.0 | THF¹ n-Heptane | 16.9 4.6 | Al(C₂H₅)₃ | 0.23 | VCl₃ | 0.61 | 0.15 | 0.15 |
| 6 | 9.7 | Diethyl ether n-Heptane | 31 5.3 | Al(i-C₄H₉)₃ | 0.60 | VOCl₂ | 0.14 | | 0.18 |

¹ THF=Tetrahydrofuran.

Example 7

A polymerization vessel free from air was charged with 33.1 parts of diethyl ether, 10.7 parts of vinyl chloride, and a catalyst prepared by mixing 0.72 part of diethylaluminum chloride and 0.19 part of vanadium tetrachloride (molar ratio of 6:1) in 3.5 parts of n-heptane and aging for 2 hours at room temperature. After 19 hours at 30°.C. the polymerization was stopped by adding 1.6 parts of butanol. To the reaction mixture was added 100 parts of diethyl ether and the insoluble polymer was separated by centrifugation, washed twice with anhydrous ethanol, and then was dried for 16 hours at room temperature under vacuum. The insoluble polymer so isolated had a specific viscosity of 0.25.

Examples 8–10

A series of polymerization vessels was charged, as in the foregoing examples, with diluent, vinyl chloride, and catalysts, the ingredients and amount of each being set forth in Table II below. In these examples the vanadium compound used as one of the catalysts was the reaction product obtained by mixing an aluminum alkyl with a vanadium compound, the amounts of each and molar ratio of aluminum alkyl to vanadium compound being given in Table II, the reaction mixture used in Examples 9 and 10 having been aged at room temperature for 2 hours and that in Example 8 having been aged for 2 hours at room temperature and then heated for 16 hours at 90° C. prior to use in the polymerization system. After 19 hours at 30° C., the polymerization reaction was stopped by adding 1.6 parts of butanol. To the reaction mixture of Example 8 was added 118 parts of anhydrous ethanol and to that of Examples 9 and 10, 100 parts of diethyl ether. The insoluble polymer was then separated, washed twice with anhydrous ethanol, and dried for 16 hours at room temperature under vacuum. The polymer obtained in Example 10 was fractionated as described above and 50% was found to be insoluble in methyl isobutyl ketone. The specific viscosities of the alcohol-ether insoluble polymers of Examples 8 and 9 and of the methyl isobutyl ketone insoluble polymer of Example 10 are given below. Each of these polymers had a crystalline-type X-ray diffraction powder pattern.

TABLE II

| Example | Vinyl chloride parts | Diluent | Parts | Organometallic compound | Parts | Reaction product formed from | | | | | Specific viscosity |
|---|---|---|---|---|---|---|---|---|---|---|---|
| | | | | | | Al alkyl | Parts | Vanadium compound | Parts | Molar ratio | |
| 8 | 9.8 | Diethyl ether / n-Heptane | 33 / 4 | Al(i-C$_4$H$_9$)$_3$ | 0.40 | Al(C$_2$H$_5$)$_3$ | 0.04 | VCl$_4$ | 0.19 | 0.36:1 | 0.29 |
| 9 | 10.8 | Diethyl ether / n-Heptane | 32.5 / 4 | Al(CH$_3$)$_2$Cl | 0.18 | Al(C$_2$H$_5$)$_3$ | 0.23 | VCl$_4$ | 0.19 | 2:1 | 0.20 |
| 10 | 11.1 | Diethyl ether / n-Heptane | 31 / 5 | Al(i-C$_4$H$_9$)$_3$ | 0.40 | Al(C$_2$H$_5$)$_3$ | 0.11 | VOCl$_2$ | 0.14 | 1:1 | 0.18 |

Examples 11–15

Polymerizations were carried out by the general procedure described for Examples 2–6 except that in each of these examples the solution of aluminum alkyl in n-heptane contained a complexing agent for the aluminum alkyl (1:1 mole ratio). In Examples 11 and 12 the polymer was isolated by adding 100 parts of diethyl ether and in Examples 13–15 by adding 118 parts of anhydrous ethanol. The alcohol-ether insoluble polymer isolated in each case had a crystalline-type X-ray diffraction powder pattern like that described above. In Examples 11–13 and 15 the polymer was treated with methyl isobutyl ketone to separate the insoluble fraction. The data for each of these examples are set forth in Table III below.

The polymer in each case was isolated as before by adding 118 parts of anhydrous ethanol to the reaction mixture. In each case the polymer had a crystalline-type X-ray diffraction powder pattern. The polyvinyl chloride produced in Examples 16 and 17 had specific viscosities of 0.22 and 0.26, respectively. That produced in Example 18 was treated with methyl isobutyl ketone to isolate the insoluble fraction. The latter amounted to 57% of the total polymer and had a specific viscosity of 0.43.

Examples 19–30

In these examples the polymerization procedure described in the foregoing examples was repeated but with various transition metal compounds and organometallic compounds. Each polymerization vessel was charged with methylene chloride as diluent, 10 parts of vinyl chloride,

TABLE III

| Example | Vinyl chloride parts | Diluent | Parts | Complexing agent | Parts | Organometallic compound | Parts | Vanadium compound | Parts | Methyl isobutyl ketone insoluble polymer | |
|---|---|---|---|---|---|---|---|---|---|---|---|
| | | | | | | | | | | Percent of total polymer | Specific viscosity |
| 11 | 11.3 | Methylene chloride / n-Heptane | 25.5 / 4.3 | Tetrahydrofuran | 0.14 | Al(i-C$_4$H$_9$)$_3$ | 0.40 | VCl$_3$[1] | 0.16 | 49 | 0.47 |
| 12 | 11.3 | Methylene chloride / n-Heptane | 25.5 / 4.3 | do | 0.14 | Al(i-C$_4$H$_9$)$_3$ | 0.40 | VCl$_3$[2] | 0.16 | 55 | 0.40 |
| 13 | 10.7 | n-Heptane | 14 | do | 0.14 | Al(i-C$_4$H$_9$)$_3$ | 0.40 | VCl$_3$[2] | 0.16 | 55 | 0.44 |
| 14 | 11.3 | Methylene chloride / n-Heptane | 25.5 / 2.7 | Triethylamine | 0.20 | Al(C$_2$H$_5$)$_3$ | 0.23 | VCl$_3$[3] | 0.16 | [4] | [4] |
| 15 | 11.3 | Methylene chloride / n-Heptane | 25.5 / 2.7 | Ethyl acetate | 0.16 | Al(i-C$_4$H$_9$)$_3$ | 0.40 | VCl$_3$[3] | 0.16 | 64 | 0.47 |

[1] Ball-milled to particle size of about 35 microns.  [2] Ball-milled to particle size of about 2 microns.  [3] Ball-milled to particle size of about 5 microns.  [4] Not isolated.

Examples 16–18

In these examples the polymerization procedure described in Examples 8–10 was repeated except that a complexing agent for the aluminum alkyl was used. It was added to the vanadium catalyst component reaction mixture in Example 16 (molar ratio of complexing agent to aluminum alkyl of 0.5:1) and in Examples 17 and 18 to the aluminum alkyl solution added to the polymerization system (molar ratio of 1:1). The data for each polymerization system are set forth in Table IV below.

and the organometallic compound suspended or dissolved in n-heptane and complexed with a molar amount of tetrahydrofuran in the case of the aluminum alkyls used in Examples 19–25. After equilibrating at 30° C., the transition metal compound suspended in n-heptane and ball-milled for about 6 hours at room temperature was added. In the case of Examples 20, 21, 28 and 29, the molybdenum pentachloride was ball-milled in carbon tetrachloride and added to the polymerization system. The transition metal compound and organometallic compound and the amount of each used as well as the molar ratio of the

TABLE IV

| Example | Vinyl chloride parts | Diluent | Parts | Complexing agent | Parts | Organometallic compound | Parts | Reaction product formed from [1] | | | | |
|---|---|---|---|---|---|---|---|---|---|---|---|---|
| | | | | | | | | Al alkyl | Parts | Vanadium compound | Parts | Molar ratio |
| 16 | 11.6 | Diethyl ether / n-Heptane | 32 / 4 | Tetrahydrofuran | 0.07 | Al(i-C$_4$H$_9$)$_3$ | 0.40 | Al(C$_2$H$_5$)$_3$ | 0.04 | VCl$_4$ | 0.19 | 0.36:1 |
| 17 | 10.3 | Methylene chloride / n-Heptane | 25.5 / 4 | do | 0.14 | Al(i-C$_4$H$_9$)$_3$ | 0.40 | LiC$_4$H$_9$ | 0.07 | VCl$_4$ | 0.19 | 1.1:1 |
| 18 | 10 | Methylene chloride / n-Heptane | 25.5 / 4 | do | 0.14 | Al(i-C$_4$H$_9$)$_3$ | 0.40 | Al(C$_2$H$_5$)$_3$ | 0.04 | VCl$_4$ | 0.19 | 0.36:1 |

[1] Aged 2 hours at room temperature.

two are set forth in Table V below. The total amount of diluent present in each case was about 35 parts. After about 20 hours at 30° C. the polymerization was stopped by adding 1.6 parts of anhydrous ethanol. The reaction mixture was then poured into 120 parts of anhydrous ethanol. The precipitated polymer was separated by filtration, dried for 16 hours under vacuum at room temperature, and then purified by dissolving it in tetrahydrofuran, filtering the solution and reprecipitating it in methanol. The specific viscosity of the polymer obtained in each case is set forth in Table V. Each of these polymers was shown to be crystalline and had the same X-ray diffraction pattern as set forth above.

TABLE V

| Ex. | Organometallic Compound | Parts | Transition Metal Compound | Parts | Molar Ratio of Organometallic to Transition Metal Compound | Specific Viscosity of Polymer (in cyclohexanone at 135° C.) |
|---|---|---|---|---|---|---|
| 19 | Al(i-C$_4$H$_9$)$_3$ | 0.40 | TaCl$_5$ | 0.358 | 2:1 | [2] 0.4 |
| 20 | Al(i-C$_4$H$_9$)$_3$ | 0.40 | MoCl$_5$ | 0.273 | 2:1 | 0.12 |
| 21 | Al(C$_2$H$_5$)$_3$ | 0.23 | MoCl$_5$ | 0.273 | 2:1 | 0.29 |
| 22 | Al(C$_2$H$_5$)$_3$ | 0.23 | VOA$_2$[1] | 0.265 | 2:1 | 0.28 |
| 23 | Al(i-C$_4$H$_9$)$_3$ | 0.40 | MnA$_3$[1] | 0.352 | 2:1 | 0.28 |
| 24 | Al(C$_2$H$_5$)$_3$ | 0.46 | CoA$_2$[1] | 0.257 | 4:1 | 0.37 |
| 25 | Al(C$_2$H$_5$)$_3$ | 0.46 | CrA$_3$[1] | 0.349 | 4:1 | 0.21 |
| 26 | Mg(C$_2$H$_5$)$_2$ | 0.25 | TiCl$_4$ | 0.19 | 3:1 | 0.16 |
| 27 | Mg(C$_2$H$_5$)$_2$ | 0.25 | ZrA$_4$[1] | 0.488 | 3:1 | 0.15 |
| 28 | Li(n-C$_4$H$_9$) | 0.26 | MoCl$_5$ | 0.273 | 4:1 | 0.25 |
| 29 | LiAl(C$_4$H$_9$)$_4$ | 0.26 | MoCl$_5$ | 0.273 | 1:1 | 0.47 |
| 30 | Mg(C$_2$H$_5$)$_2$ | 0.25 | FeA$_3$[1] | 0.353 | 3:1 | 0.16 |

[1] A represents the acetylacetonate radical.
[2] At 25° C.

This application is a continuation-in-part of my U.S. patent application Ser. No. 579,139 filed Apr. 19, 1956 and now abandoned.

What I claim and desire to protect by Letters Patent is:

1. The process of homopolymerizing vinyl chloride which comprises contacting vinyl chloride with a catalyst, formed by mixing a compound selected from the group consisting of halides and acetylacetonates of a metal selected from the group consisting of the metals of Groups IV-B, V-B, VI-B, VII-B and VIII of the Periodic Table with an alkyl compound of a metal selected from the group consisting of alkali metals, alkaline earth metals, zinc and aluminum in a molar ratio of from about 1:0.1 to about 1:20.

2. The process of claim 1 wherein the polymerization is carried out in the presence of a complexing agent for the metal alkyl compound, said complexing agent being selected from the group consisting of ethers, tertiary amines, and esters.

3. The process of homopolymerizing vinyl chloride which comprises contacting vinyl chloride with a catalyst formed by mixing a Group IV-B metal halide with an alkyl compound of a metal selected from the group consisting of alkali metals, alkaline earth metals, zinc and aluminum in a molar ratio of from about 1:0.1 to about 1:20.

4. The process of homopolymerizing vinyl chloride which comprises contacting vinyl chloride with a catalyst formed by mixing a Group V-B metal halide with an alkyl compound of a metal selected from the group consisting of alkali metals, alkaline earth metals, zinc and aluminum in a molar ratio of from about 1:0.1 to about 1:20.

5. The process of homopolymerizing vinyl chloride which comprises contacting vinyl chloride with a catalyst formed by mixing a Group VI-B metal halide with an alkyl compound of a metal selected from the group consisting of alkali metals, alkaline earth metals, zinc and aluminum in a molar ratio of from about 1:0.1 to about 1:20.

6. The process of homopolymerizing vinyl chloride which comprises contacting vinyl chloride with a catalyst formed by mixing a Group VII-B metal halide with an alkyl compound of a metal selected from the group consisting of alkali metals, alkaline earth metals, zinc and aluminum in a molar ratio of from about 1:0.1 to about 1:20.

7. The process of homopolymerizing vinyl chloride which comprises contacting vinyl chloride with a catalyst formed by mixing a Group VIII metal halide with an alkyl compound of a metal selected from the group consisting of alkali metals, alkaline earth metals, zinc and aluminum in a molar ratio of from about 1:0.1 to about 1:20.

8. The process of homopolymerizing vinyl chloride which comprises contacting vinyl chloride with a catalyst formed by mixing a Group IV-B metal halide with an alkyl compound of an alkaline earth metal in a molar ratio of from about 1:0.1 to about 1:20.

9. The process of homopolymerizing vinyl chloride which comprises contacting vinyl chloride with a catalyst, formed by mixing a vanadium halide with an alkylaluminum compound in a molar ratio of from about 1:0.1 to about 1:20.

10. The process of claim 9 wherein the polymerization is carried out in the presence of a complexing agent for the alkylaluminum compound, said complexing agent being selected from the group consisting of ethers, tertiary amines, and esters.

11. The process of homopolymerizing vinyl chloride which comprises contacting vinyl chloride with a catalyst, formed by mixing a vanadium chloride with an alkylaluminum compound in a molar ratio of from about 1:0.1 to about 1:20, in the presence of at least about one mole of an ether per mole of said alkylaluminum compound.

12. The process of claim 11 wherein the vanadium chloride is vanadium trichloride.

13. The process of claim 12 wherein the alkylaluminum compound is an aluminum trialkyl.

14. The process of claim 13 wherein the ether is tetrahydrofuran.

15. The process of claim 14 wherein the particle size of the vanadium trichloride is less than about 35 microns.

References Cited

UNITED STATES PATENTS

| | | | |
|---|---|---|---|
| 2,439,528 | 4/1948 | Roedel | 260—93.7 |
| 2,440,498 | 4/1948 | Young et al. | 260—85.3 |
| 2,593,417 | 4/1952 | D'Alelio | 260—93.7 |
| 2,631,997 | 3/1953 | Stewart | 260—94.9 |
| 2,842,474 | 7/1958 | Pratt | 260—94.9 |
| 2,882,264 | 4/1959 | Barnes et al. | 260—94.9 |
| 3,103,503 | 9/1963 | Fox et al. | 260—89.5 |
| 2,239,780 | 4/1941 | Fikentscher et al. | |
| 2,827,447 | 3/1958 | Nowlin. | |

(Other references on following page)

FOREIGN PATENTS 533,362  5/1955  Belgium.

OTHER REFERENCES

Schildknecht "Vinyl and Related Polymers," Wiley, New York, 1952, p. 429.

Sproull, X-rays in Practice, McGraw-Hill, New York (1946), pp. 430–440.

Alfrey et al., "Plasticized Polyvinyl Chloride," Industrial and Engineering Chemistry, vol. 41, No. 4, pp. 701–3 (April 1949).

JOSEPH L. SCHOFER, *Primary Examiner.*

HARRY WONG, JR., *Assistant Examiner.*

U.S. Cl. X.R.

252—429; 260—32.8